United States Patent [19]

Kuehnemann et al.

[11] 3,710,240
[45] Jan. 9, 1963

[54] CIRCUIT ARRANGEMENT FOR THE DETECTION OF FAULTS OR POINTS ON INHOMOGENEOUS ELECTRIC LINES OR CABLES ACCORDING TO THE IMPULSE REFLECTION METHOD UTILIZING AN ADJUSTABLE BALANCING NETWORK

[75] Inventors: Karl Kuehnemann, Munich; Josef Turban, Ebenhausen, both of Germany

[73] Assignee: Siemens Aktiengesellschaft, Berlin and Munich, Germany

[22] Filed: Feb. 1, 1971

[21] Appl. No.: 111,373

[30] Foreign Application Priority Data

Feb. 3, 1970   Germany..................P 20 04 848.0

[52] U.S. Cl.....................................324/52, 324/98
[51] Int. Cl........................G01r 31/08, G01r 17/02
[58] Field of Search......324/51, 52, 60, 132, 95, 106; 323/75 B, 75 F, 75 K; 333/23

[56] References Cited

UNITED STATES PATENTS

| | | | |
|---|---|---|---|
| 2,800,627 | 7/1957 | Oudin et al. | 324/52 |
| 3,255,406 | 6/1966 | Schluter | 324/52 |
| 1,519,870 | 12/1924 | Milnor | 333/23 |
| 2,956,234 | 10/1960 | Olsen | 323/75 K |
| 2,345,932 | 4/1944 | Gould | 324/52 |
| 3,156,865 | 11/1964 | Lamont | 324/52 X |
| 2,476,317 | 7/1949 | Nelson et al. | 324/52 |
| 3,115,603 | 12/1963 | Fluegel | 324/60 R |
| 3,350,701 | 10/1967 | Bell | 324/60 R X |
| 2,872,643 | 2/1959 | Rockwell | 324/132 X |

OTHER PUBLICATIONS

Thyrite; A G.E. Resistance Material, General Electric Pub. Received in U.S. Patent Office 4-4-50.

*Primary Examiner*—Gerard R. Strecker
*Attorney*—Hill, Sherman, Meroni, Gross & Simpson

[57] ABSTRACT

A circuit arrangement for the detection of faulty or inhomogeneous points on electrical lines or cables, according to the impulse-reflection method, in which test impulses are applied to the line input over a bridge circuit and the reflecting impulse components are evaluated as to their magnitude and/or transit time; in an evaluation device which is arranged at the output side of the bridge circuit, the bridge circuit being adapted to be balanced by means of an adjustable balancing network in which there is disposed a variable ohmic resistance which is constructed in the form of an electrically-controlled resistance to which is connected a control circuit for effecting the adjustment thereof and adapted to have the resistance thereof varied by a control circuit employing a direct current or a low frequency alternating current bridge which contains a manually controllable element for effecting the desired resistance change. An electrically controlled capacitance may also be provided for the balancing of reactive components.

13 Claims, 3 Drawing Figures

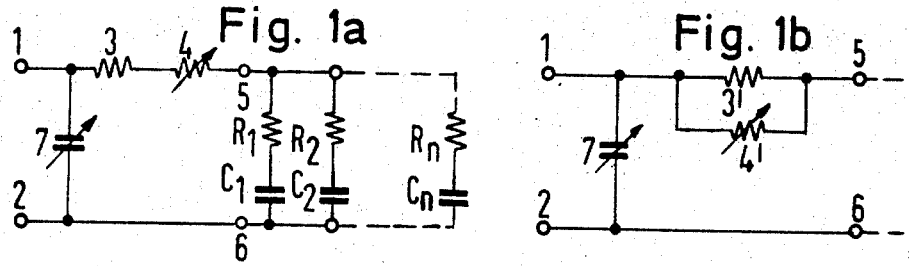
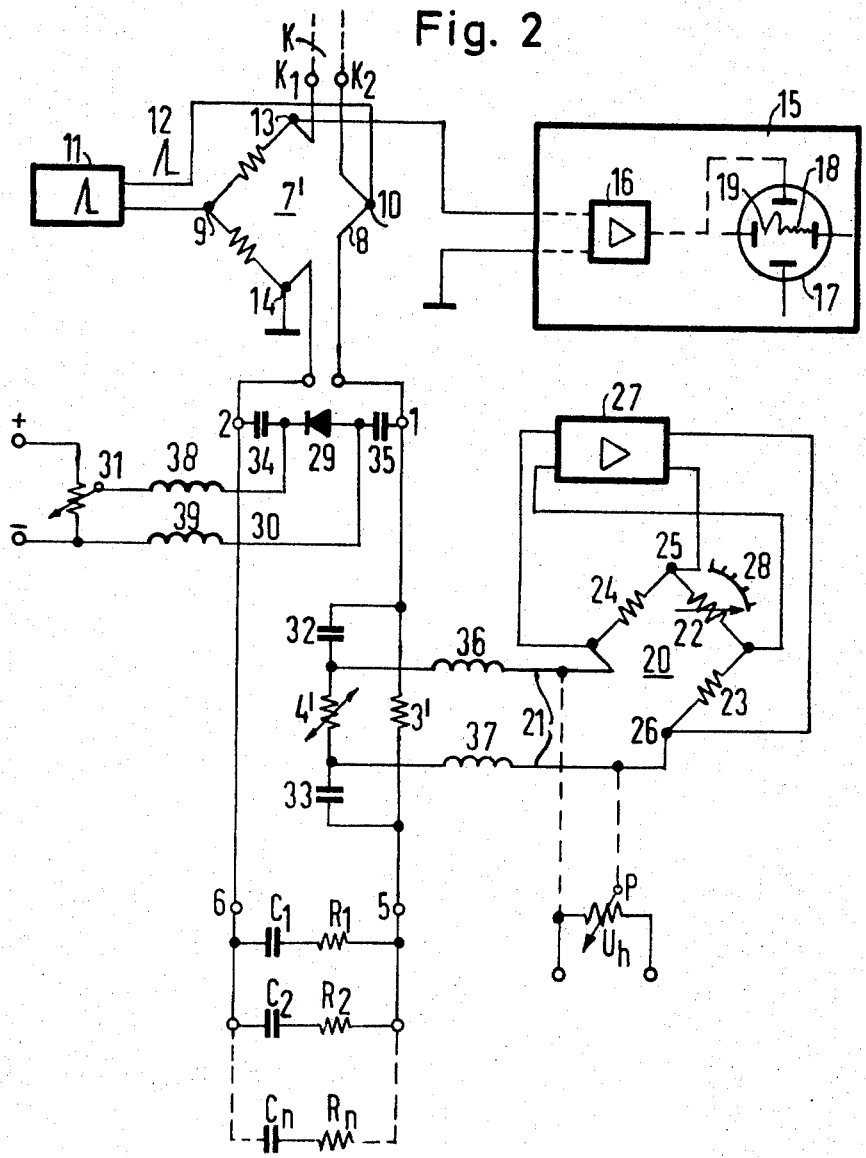

CIRCUIT ARRANGEMENT FOR THE DETECTION OF FAULTS OR POINTS ON INHOMOGENEOUS ELECTRIC LINES OR CABLES ACCORDING TO THE IMPULSE REFLECTION METHOD UTILIZING AN ADJUSTABLE BALANCING NETWORK

BACKGROUND OF THE INVENTION

The invention is directed to a circuit arrangement for the detection of faulty or inhomogeneous points on electrical lines or cables, employing the impulse-reflection method, in which test impulses are supplied to the line input over a bridge circuit, and the reflected impulse components are evaluated, as to their magnitude and/or transit time, in an evaluation device which is connected at the load side of the bridge output, and in which the bridge circuit can be balanced or equalized by means of an adjustable balancing network.

The bridge circuit, which also can be constructed in the form of a differential circuit, contains in respective branches thereof the input resistance of the line or cable involved and a balancing network. In a balance or equalized state, the cooperable evaluation device which is also connected to the bridge output, is decoupled to a high degree from the test impulses which are supplied to the input bridge diagonal. With an incomplete equalization or balancing, however, the test impulses can disrupt the operation by creating a timewise limited overexcitation of the amplifier contained in evaluation device and since such test impulses have an essentially larger amplitude than the reflecting impulse components thereof, to avoid overexcitation, the entire evaluation device must be periodically rendered inoperative for a predetermined amount of time after the occurrence of each test impulse. As a result, a portion of the possible measuring range of the device, corresponding to such period of time, cannot be utilized. It is therefore exceedingly important to balance the bridge within very limited tolerances to avoid such overexcitation.

It is also common practice to directly read off values of the line characteristics, such as the value of the real component of the wave impedance for very high frequencies when the circuit is in balanced condition, and the line balancing network therefore is, in such case, provided with adjusting means which is accordingly calibrated. Consequently, the demands on the exactness of the bridge equalization or balancing increase with the required demands on accuracy.

Prior art circuit arrangements, of this type, heretofore available, have not permitted the execution of the bridge balancing within narrow tolerances such as required for highly accurate fault-location measurements or accurate detections of the line characteristic values by means of the adjustment of the line balancing functions, and the invention is therefore directed to the problem of eliminating this disadvantage.

BRIEF DESCRIPTION OF THE INVENTION

The problem involved is overcome in the present invention by the utilization of a variable ohmic resistance which is disposed in the line balancing network and is constructed for electrical control, such resistance being adjustable over control circuits, in particular a direct-current bridge, or a low frequency alternating-current bridge, containing the manual adjusting means for effecting the desired change in resistance value of such electrically-controllable resistance.

In accordance with a further development of the invention the line balancing network employs a variable capacitance, serving primarily for equalization of the reactive component of the line input, such capacitance also being constructed in the form of an electrically-controllable element, preferably in the form of a capacitance diode, whereby adjustment thereof may be effected over a control circuit containing the manually actuatable means for effecting the desired capacitance adjustment.

The control circuits for effecting the desired adjustments are so designed that a remote control of the capacitance and/or of the ohmic resistance in the line balancing network may be effected by a remote control, whereby the adjusting means preferably is arranged at the location of the evaluation device, which normally is remote from the input side of the line involved and/or the bridge circuit.

The invention has the important advantage, which is of particular importance in the impulse-reflection method, of enabling the balancing of the bridge over the entire frequency range with the desired accuracy required, as a result of the utilization of the variable structure. This advantage is of even greater importance in a circuit employing a variable capacitance as the reactive component appearing at the line input may thereby be compensated so that it does not disadvantageously influence the desired line balancing. As the control circuits are constructed for remote control of the adjustment of the ohmic resistance and, preferably, also of the capacitance, measurements can be effected at previously-laid cables in a relatively simple manner. The bridge circuit, including the line balancing network, is advantageously connectible to the cable input at a readily accessible point on the cable, such as at an appropriately located cable or duct junction, manhole, etc., while the adjusting means is disposed at the location of the evaluation device and thus readily available to the person watching the reflection picture, as indicated on a cathode-beam oscillograph of the evaluation device, whereby such person may readily effect the desired control of the balancing operation. The balancing is thereby achieved, as in the other applications of the invention, in such a way that the deflection of the electron beam resulting from portions of the test impulses directly transmitted over the bridge circuit, is reduced to a bare minimum.

BRIEF DESCRIPTION OF THE DRAWINGS

In the drawings, which illustrate a preferred example of the present invention, and in which like reference characters indicate like or corresponding parts:

FIGS. 1a and 1b illustrate two examples of a coaxial cable balancing circuit; and FIG. 2 illustrates an embodiment of the invention employing electrically controllable circuits for the control of both the ohmic resistance and capacitance of a balancing network.

DETAILED DESCRIPTION OF THE INVENTION

Referring to FIG. 1, and more particularly to FIG. 1a, the reference numerals 1 and 2 designate respective input terminals of a coaxial-cable balancing network comprising a series connected fixed ohmic resistance 3 and an adjustable ohmic resistance 4 which, in turn, are likewise disposed in series relation with respect to the input 5, 6 of a four-terminal chain network having a plurality of series connected resistance-capacitance groups respectively comprising resistance $R_1$, capacitance $C_1$; $R_2$, $C_2$; ... $R_n$, $C_n$, forming one or more shunt impedances across the terminals 5, 6. In this arrangement the series connection 3, 4 corresponds to the real component of the cable wave impedance for very high frequencies, while the four-terminal chain network balances the frequency dependent portion of the wave impedance. A capacitance 7 is disposed across the input terminals 1 and 2 and thus bridges the series circuit of 3, 4 and 5, 6, and serves for the additional equalization of imaginary impedance components, i.e., reactive components occurring at the cable input.

FIG. 1b illustrates a variation of the circuit of FIG. 1a in which the series connection of resistances 3, 4 is replaced by a parallel connection of corresponding resistances 3', 4', the resistance value of the parallel connection 3', 4', however, coinciding with that of the series connection 3, 4.

The variations in the cable balancing networks according to FIGS. 1a and 1b are common practice, and in which in place of series combinations in the shunt impedance ohmic resistances may be provided in the respective lines, and capacitances in the shunt impedances.

FIG. 2 schematically illustrates a circuit arrangement embodying the invention for detecting faulty or inhomogeneous places of an electric cable K in which the cable input $K_1$, $K_2$ is inserted into one of the branches of a resistance bridge 7'. The bridge 7' contains a cable balancing network having input terminals 1, 2, in the branch 8 of the bridge, which network is constructed in accordance with FIG. 1b of the drawings. A suitable impulse producer 11 is adapted to provide periodic test impulses 12 which are supplied to the bridge across the input diagonal 9, 10 and thus simultaneously supplied to the cable K, to be tested, and the cable balancing network having input terminals 1, 2, whereby such impulses do not reach the output terminals 13, 14 if the bridge 7' is in a perfectly balanced condition, and thus would be prevented from reaching an evaluation device 15 connected to the terminals 13, 14 at the output side of the bridge. In such case, those impulse components which are of an essentially smaller amplitude and which are reflected from the faulty point of the cable K to the cable input $K_1$, $K_2$ are received by the evaluation device 15 over the output terminals 13, 14, which reflected components are amplified in the amplifier 16 of the device 15 and suitably fed to the vertical deflection system of a cathode beam oscillograph 17, which is suitably synchronized at the repetition frequency of the test impulses 12. The so-called "reflection picture" 18 of the cable thus appears on the picture screen of the oscillograph, and provides means for evaluation of the faulty or inhomogeneous points of the entire length of the cable or of a part of it. As previously mentioned, it is possible for a strong additional deflection 19 to appear on the picture screen when the bridge 7' is in an unbalanced or insufficiently balanced condition due to components of the individual test impulses 12 which are directly transmitted to the device 15 and which may thereby cause a time-defined over-excitation of the amplifier 16.

In order to eliminate, to as great a degree as possible, the disadvantages which occur with an incomplete balancing of the bridge 7', the line balancing circuit corresponding to that of FIG. 1b, in the illustrated embodiment, is so constructed that the variable resistance 4' of the circuit of FIG. 1b is constructed as an electrically-controllable resistance, which can be adjusted as desired over a control circuit 21. Such adjustment can be effected either by means of a potentiometer P, connected to the circuit 21 to which is supplied an auxiliary voltage $U_h$, or the adjustment may, with particular advantage, be effected over a bridge circuit 20, of which the circuit 21 is a part, as illustrated in FIG. 2. Such bridge circuit thus contains in one of its branches the controllable resistance 4' and in the opposite branch a potentiometer 22, while the remaining branches are provided with respective fixed resistances 23 and 24. The input diagonal 25, 26 of the bridge circuit 20, 21 is connected with the output of an amplifier 27, and the bridge output is connected to the input of such amplifier. The amplifier 27 thus is coupled back over 20, 21 whereby the dimensioning of the circuit may be so determined that it is self-excited.

After the circuit is switched on, the strongly-tuned bridge initially adjusts itself into a balance state by changing the resistance value 4' as determined by the maximum ratio between input and output voltages of the amplifier 27. This results in the very advantageous possibility of controlling the resistance value of 4' by means of the adjustable potentiometer 22 whereby, with very high frequencies, the real component of the input impedance of the cable balance can be read directly from a scale 28 which preferably is suitable calibrated with respect to the values of the entire resistance of the parallel circuit 3' and 4', and in the balanced condition thus corresponds to the real component of the cable wave impedance for very high frequencies. This value is of particular interest in classification of the cable K and thus it is particularly desirable that it be determinable with as much accuracy as possible. The four-terminal chain circuit which extends from 5, 6, corresponds to the circuit portion in FIG. 1b having the same reference numerals.

The balance of the bridge 7' as previously mentioned, can be further improved if the imaginary component at the cable input $K_1$ and $K_2$ is also taken into consideration. The variable capacitance 7 illustrated in FIGS. 1a and 1b thus may be utilized for balancing purposes and therefore likewise preferably is designed as an electrically controllable element. This is realized in the circuit of FIG. 2 by employing a capacitance diode 29 which is disposed in a control circuit 33, poled in blocking direction. A potentiometer 31, which supplies the negative bias voltage, is adjustable to provide the desired variations in capacitance. Coupling capacitors 32, 33 serve to isolate the control circuit for resistance 4' from the remainder of the balancing network and in like manner coupling capacitors 34, 35 serve to isolate the control circuit for the capacitance diode 29 from the remainder of the balancing network.

The control circuits 21 or 20, 21 and possibly 30 can be advantageously utilized for the remote control of the controllable elements 4 and 29. This is of particular importance in applications in which the cable balancing network is disposed at the input $K_1$, $K_2$ of an already laid cable, for example in a cable duct, and the evaluation device is disposed at a place that is relatively distant therefrom. Since the person performing the measurements and who effects the balancing of the bridge 7', utilizes the reflection picture 18 as a balancing indication, it is possible, utilizing extended lines 21 and 30, to dispose the adjusting means 22 and possibly the adjusting means 31 at the location of the evaluation device 15 so that the balancing operation can be effected in a very simple and accurate manner.

Having thus described my invention it will be apparent that various immaterial modifications may be made in the same without departing from the spirit of my invention.

I claim as my invention:

1. In a circuit arrangement for the detection of faulty or inhomogeneous places on electrical lines or cables according to the impulse-reflection method, in which test impulses are applied to the line input over a bridge circuit and the reflected impulse components are evaluated as to their magnitude and/or transit time in an evaluation device which is arranged at the output side of the bridge circuit, and in which the bridge circuit can be balanced by means of an adjustable balancing network, the combination of a variable ohmic resistance disposed in the balancing network, which resistance is constructed in the form of an electrically controlled resistance, and a control circuit operatively connected to said controllable resistance for effecting adjustment of the resistance value thereof, said control circuit including an adjustable element constructed for remote control operation, such adjustable element being located at the location of the evaluation device which is disposed at a distance from the line input and/or the balancing bridge network.

2. A circuit arrangement according to claim 1, wherein said control circuit therefor is in the form of a resistance bridge circuit containing an adjustable element operable to vary the characteristics of such resistance bridge.

3. A circuit arrangement according to claim 1, in which the line balancing network includes a variable capacitance which serves primarily for the balancing of the reactive components at the line input, wherein such variable capacitance is also an electrically controllable element, preferably in the form of a capacitance diode, and a control circuit connected thereto which contains an adjustable element for effecting such capacitance change, said last mentioned control circuit including an adjustable element constructed for remote control operation, such adjustable element being located at the location of the evaluation device which is disposed at a distance from the line input and/or the balancing bridge circuit.

4. A circuit arrangement according to claim 1, wherein the line balancing network comprises a fixed ohmic resistance operatively connected to said variable resistance, and a four-terminal network comprising at least one resistance-capacitance combination to form at least one shunt impedance, said resistances being in series with said four-terminal network.

5. A circuit arrangement according to claim 4, wherein said fixed and variable resistances are connected in series.

6. A circuit arrangement according to claim 4, wherein said fixed and variable resistances are connected in parallel.

7. A circuit arrangement according to claim 2, wherein said control circuit for said variable resistance comprises a resistance bridge circuit which contains the controllable element involved in a branch of such bridge and means including an amplifier forming a current path connecting the input of such resistance bridge with the output thereof whereby such bridge circuit is self-exciting.

8. A circuit arrangement according to claim 7, wherein the controllable resistance is coupled to said balancing network by respective capacitors.

9. A circuit arrangement according to claim 2, in which the line balancing network includes a variable capacitance which serves primarily for the balancing of the reactive components at the line input, wherein such variable capacitance is also an electrically controllable element, preferably in the form of a capacitance diode, and a control circuit connected thereto which contains an adjustable element for effecting such capacitance change.

10. A circuit arrangement according to claim 9, wherein said control circuit for said variable resistance comprises a resistance bridge circuit which contains the controllable element involved in a branch of such bridge and means including an amplifier forming a current path connecting the input of such resistance bridge with the output thereof whereby such bridge circuit is self-exciting.

11. A circuit arrangement according to claim 10, wherein the controllable resistance is coupled to said balancing network by respective capacitors.

12. A circuit arrangement according to claim 11, wherein the controllable capacitance is coupled to said balancing network by respective capacitors, and is coupled to its control circuit by respective inductances.

13. A circuit arrangement according to claim 3, wherein the control circuit for the controllable capacitance comprises a potentiometer.

* * * * *